J. B. FORSYTH.

Manufacture of India Rubber Rollers.

No. 2,589. Reissued May 7, 1867.

Witnesses.

F. A. Jackson

J. A. Serwe

Inventor

James B. Forsyth

Per Munn & Co attorneys.

United States Patent Office.

JAMES B. FORSYTH, OF ROXBURY, MASSACHUSETTS.

*Letters Patent No.* 59,580, *dated November* 13, 1866; *reissue No.* 2,589, *dated May* 7, 1867.

IMPROVEMENT IN THE MANUFACTURE OF INDIA-RUBBER ROLLERS.

The Schedule referred to in these Letters Patent and making part of the same.

TO ALL WHOM IT MAY CONCERN:

Be it known that I, JAMES B. FORSYTH, of Roxbury, in the county of Norfolk, and State of Massachusetts, have invented certain Improvements in Rollers for Clothes-Wringers and for other purposes, of which the following is a full, clear, and exact description, reference being had to the accompanying drawings, making part of this specification, in which—

Figure 1:
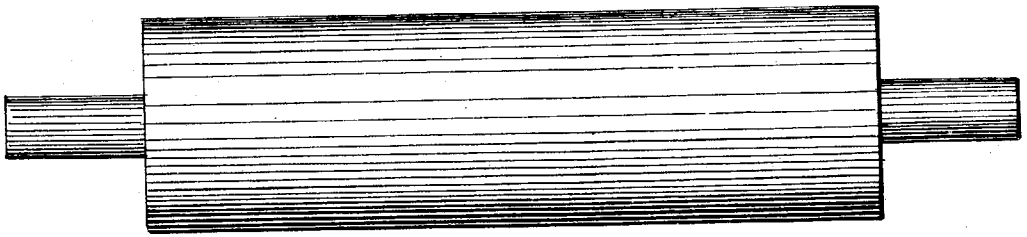
Figure 1 is either a plan or a side elevation of a roller with my improvements applied thereto.
Figure 2:
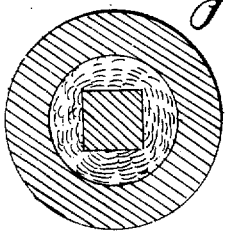
Figure 2 is a transverse diametrical section through the same.

Rollers of the ordinary construction, in which the material surrounding the shaft is elastic throughout, are objectionable for the reason that, sooner or later, they become loosened from the shaft, owing to the twist or strain to which they are subjected when performing the functions for which they are designed. To avoid this difficulty is the object of my invention, which consists in a roller, the outside of which is soft and elastic, and made of India rubber or other vulcanizable material, while its inside is but semi-elastic, and composed of India rubber or other suitable material, ground rubber rags, sulphur, oxide of zinc, calcined magnesia, and lamp-black, compounded in such manner and in such proportions that the strain and tendency to twist and become loosened from the shaft are effectually resisted, the core being capable of expanding when warm and contracting when cold, thus effecting a complete and permanent union with the outside of the roller and shaft, as desired.

To enable others skilled in the art to understand and use my invention, I will proceed to describe the manner in which I have carried it out.

The ingredients which I use for the core or inside of my improved roller are mixed together in about the following proportions, viz: India rubber, four pounds; rubber rags or fibrous material, four pounds; flour of sulphur, five pounds; white oxide of zinc, two pounds; calcined magnesia, one-eighth pound; lamp-black, one-fourth pound. All these ingredients are intimately mixed and comminuted by grinding them, or by any other suitable means, and the mass is then cured in a well-known manner. The compound thus obtained possesses the property of expanding when heated and contracting and becoming firm when cold, thus particularly adapting it for use in rollers for clothes-wringers; and I will now describe two methods of making the same:

First. I procure a long rod of a suitable size to form the hole or opening required in the roller. I then wrap around this rod a sufficient number of plies or thicknesses of the semi-elastic composition to form the required size of the core or inside of the roller. I then wrap around this core a sufficient number of plies or thicknesses of the soft or elastic stock to produce the desired size and elasticity of the outside of the roller. Alternate sheets of cloth may be used in the construction of both the outside and core or inside of the roller, if desired. The rubber roll or tube thus made is now removed from the rod and cut into lengths corresponding to that required for the roller. Each of these lengths or pieces is then placed on a suitable mandrel and wrapped in cloth or other material, or put into a mould and cured or vulcanized, after which it is removed therefrom and forced upon the shaft it is intended to work on. To facilitate the insertion of the shaft the roller is dipped into hot or boiling water for fifteen or twenty minutes, which serves to soften and expand the interior sufficiently to receive a shaft about one-sixteenth of an inch larger than the hole in the roller when it is taken from the rod upon which it is wound up. While the roller is still warm rubber cement is placed in the hole to still further assist the passage of the shaft therein. As the semi-elastic stock becomes cool it shrinks and embraces the shaft so firmly that it is scarcely possible to turn or twist it thereon.

Second. A suitable shaft is procured, and cemented or coated with rubber, which, after drying, is ready to receive the folds of semi-elastic stock above described, with cloth interposed, or not, therewith. The core thus laid on is covered, as before explained, by the soft or elastic stock, with or without alternate layers or plies of cloth, until the desired size of the roller is obtained, when it is wrapped in cloth or other suitable material, or is put into a mould and cured or vulcanized. The roller with its shaft is then removed therefrom, and is ready for use. After vulcanization the two kinds of stock, soft or elastic and semi-elastic, will be found to be permanently and firmly united together, and the two materials are thoroughly cured and incorporated together. The degree of heat required to cure the semi-elastic core is the same as that required to cure the ordinary elastic roller. This latter process of making the roller avoids the time and labor of removing it after being vulcanized, and placing it on to the shaft where it is to remain permanently. When the roller is made up and vulcanized on the shaft upon which it is to remain permanently for use, the form of the shaft may be either round, square, grooved, ribbed, or provided with a screw-thread; but when it is of any other form in section than circular it will be necessary to fill in around the shaft sufficiently to form a circular surface upon which to wind the plies of the material constituting the core and outside of the roller. It is evident that the quantities of the ingredients forming the semi-elastic compound above named may be varied, and some of them may be omitted, or other ingredients may be substituted therefor, if desired, without departing from the spirit of my invention.

*Claim.*

What I claim as my invention, and desire to secure by Letters Patent, is—

A roller for clothes-wringers and for other purposes, made substantially as herein described, as a new article of manufacture.

JAMES B. FORSYTH.

Witnesses:

N. W. STEARNS,

W. J. CAMBRIDGE.